US008371001B2

(12) United States Patent
Vass

(10) Patent No.: US 8,371,001 B2
(45) Date of Patent: Feb. 12, 2013

(54) STRETCHABLE, ELASTIC TIE-DOWN DEVICE WITH FABRIC FASTENING MEANS

(75) Inventor: Richard Vass, Richmond, VA (US)

(73) Assignee: BetterBungee LLC, Richmond, VA (US)

(*) Notice: Subject to any disclaimer, the term of this patent is extended or adjusted under 35 U.S.C. 154(b) by 156 days.

(21) Appl. No.: 12/758,465

(22) Filed: Apr. 12, 2010

(65) Prior Publication Data

US 2010/0257703 A1    Oct. 14, 2010

Related U.S. Application Data

(60) Provisional application No. 61/168,745, filed on Apr. 13, 2009.

(51) Int. Cl.
  *A44B 18/00*  (2006.01)
(52) U.S. Cl. .................. 24/306; 24/301; 24/265 CD
(58) Field of Classification Search .................. 24/17 R, 24/306, 298, 300–302, 481, 484, 265 R, 265 CD, 24/265 A, 304; 224/572, 250, 222, 409, 224/620, 675, 16 R; 604/179
See application file for complete search history.

(56) References Cited

U.S. PATENT DOCUMENTS

| 702,398 | A | * | 6/1902 | Bowyer | 224/250 |
| 3,030,685 | A | * | 4/1962 | Reiter | 24/265 A |
| 3,696,850 | A | * | 10/1972 | Rosenblum | 190/108 |
| 4,126,951 | A | * | 11/1978 | Antonious | 36/54 |
| 4,420,104 | A | * | 12/1983 | Dilenno | 224/250 |
| 4,712,766 | A | * | 12/1987 | Ehrenhalt | 251/90 |
| 4,759,963 | A | * | 7/1988 | Uso et al. | 428/100 |
| 5,062,717 | A | * | 11/1991 | Shockley | 383/20 |
| 5,104,076 | A | * | 4/1992 | Goodall, Jr. | 248/205.2 |
| 5,174,483 | A | * | 12/1992 | Moore et al. | 224/250 |
| 5,214,874 | A | * | 6/1993 | Faulkner | 43/25.2 |
| 5,271,745 | A | * | 12/1993 | Fentress et al. | 604/179 |
| 5,475,901 | A | * | 12/1995 | Anscher | 24/265 H |
| 5,535,928 | A | * | 7/1996 | Herring | 224/250 |
| 5,806,730 | A | * | 9/1998 | Deno | 224/148.6 |
| 5,913,483 | A | * | 6/1999 | Polk | 24/712.3 |
| 5,927,210 | A | * | 7/1999 | Hacker | 108/43 |
| D416,784 | S | * | 11/1999 | Singer | D8/356 |
| 6,318,612 | B1 | * | 11/2001 | MacNeil | 224/572 |
| 6,763,554 | B1 | * | 7/2004 | Torrey et al. | 24/30.5 P |
| 6,896,458 | B1 | * | 5/2005 | Romero | 410/97 |
| 7,587,796 | B1 | * | 9/2009 | Schultz | 24/306 |

* cited by examiner

*Primary Examiner* — Robert J Sandy
*Assistant Examiner* — Abigail E Morrell
(74) *Attorney, Agent, or Firm* — Brian J. Teague

(57) ABSTRACT

An elastic tie down device having a body comprising an elongated, substantially flat, elastic material with a first end and a second end; a first, flexible hook and loop fastener panel secured to the body along the axis of the elongated body at one end of the body, the first panel extending beyond the length of the body; and a second, flexible hook and loop fastener panel secured to the body opposite the first panel and aligned substantially perpendicularly to the axis of the elongated body, the second panel secured to the body at a same end of the body as the first panel.

6 Claims, 6 Drawing Sheets

STRETCHABLE, ELASTIC TIE-DOWN DEVICE WITH FABRIC FASTENING MEANS

This application claims priority to U.S. Provisional Application No. 61/168,745, filed Apr. 13, 2009, the contents of which are incorporated herein by reference in its entirety.

FIELD OF THE DISCLOSURE

This invention relates to a stretchable, elastic tie-down device for securing items. More specifically, the disclosed device includes a stretchable band, cord, lanyard, rope, cable or the like wherein a first, flexible, two-sided hook and loop fastener panel is provided at each end. In one embodiment, a second, flexible, two-sided hook and loop fastener panel is attached to the stretchable tie-down device proximate to each end, and the second fastener panel is positioned perpendicular to the axis of the tie down device. Each fastener has hooks on one side of the panel and loops on the other. The stretchable, elastic device terminates with hook and loop fasteners at each end. In one embodiment, the fasteners selectively secure a rigid hook.

BACKGROUND OF THE INVENTION

Bungee-type cords are traditionally used to secure loads. Over time, improvements have been introduced to resist abrading, resist rupturing, and the like. However, a typical elastic tie down device terminates at some form of rigid hook. That is, a hook at a first end is secured to a surface and the cord is stretched so that a hook at the second end can be attached to another surface under tension. Basically, the tension in the tie down device is used to secure an item and ensure that the hook(s) remain attached. The tension can cause the cord to break and may lead to the rigid hooks scratching a surface of the item they are being secured to.

In fact, rigid hooks often damage the underlying surface they are attached to. Also, the rigid hook may not be the correct size to secure to a surface. For instance, a round bar (such as in a luggage rack) can have a diameter such that the rigid hook cannot fit around the bar. Moreover, if the hook is not attached correctly, say at an angle, it is possible for the hook to slip off. Rigid hooks also become deformed or bend out of shape. A conventional tie down device does not allow a user to selectively remove or attach hooks to the tie down device.

It is also known that a user, attempting to stretch the tie down device to a sufficient length to reach an anchor point, can pull one of the hooks loose during installation of the tie down device. The hook, under substantial stress and tension via the tie down device, then becomes a projectile moving directly at the user. The loose hook can cause painful and even permanent injuries to the user.

There is a need for a still further new and improved elastic tie-down device. Such a device would prevent damage or marring of the surface to which the tie-down device is being secured. The tie-down device would be suitable with a wide range of connections points. In other words, it would fit around larger anchor points or oddly shaped anchor points that are not operable with traditional tie down hooks. The improved device would not deform over time, and it would prevent or reduce injuries due to premature release of the cord. The improved device might also allow for the selective attachment of a traditional, rigid hook. The tie down device of the subject disclosure solves this and other needs.

SUMMARY OF THE DISCLOSURE

The subject disclosure provides a stretchable, elastic tie down device and an optional, selectively releasable rigid hook. The elastic device, in one embodiment, includes an elongated flat, double-ply body. The body includes first and second ends. A first, flexible hook and loop fastener panel is secured along the axis of the elongated device body at each end of the body. The first fastener panel extends beyond the length of the body. A second hook and loop fastener panel extends perpendicularly from the body proximate each end of the body. In use, the first fastener panel is folded back and secured to the second fastener panel. The first and second panels are attached to opposite sides of the tie down device body. Either the hooks or the loops will face each other between the two panels. The corresponding second fastener panel is then folded around the corresponding first fastener and the body of the tie down device. Depending on the length of the second fastener panel, the panel might wrap around the tie down device one or more times.

The first fastener panel creates a loop, and the resulting loop can be used to anchor the device to an anchor point. The second fastener panel provides additional strength. It was surprisingly found that the subject construction provided ample strength to replace conventional rigid hooks while providing certain benefits including, but not limited to, the ability to use the fasteners on wide array of anchor points (various sizes and shapes) without causing damage to the underlying anchor point. Conventional wisdom dictates that a fabric fastener such as the subject hook and loop fasteners would not be suitable for use with a tie down device due to insufficient strength.

In another embodiment, a flexible hook and loop fastener panel is divided into two arms or forks that extend away from tie down device body substantially along the axis of the body. The "forked" fasteners are operable with tubular tie down device bodies.

In further detail, one embodiment of the stretchable, elastic tie down device comprises a stretchable, flat body. The body may comprise two layers of flat, stretchable material sewn together. This double-ply construction is unconventional relative to known tie down devices that are either tubular and stretchable, flat but non-stretchable, or otherwise comprise a single ply body. Generally, conventional tie down devices comprise tubular bodies and therefore cannot or would not be joined in a double ply construction. In fact, the subject tie down construction was difficult achieve in that each ply of the body is relatively thick in order to supply sufficient strength. Stitching the thick plies together proved difficult. It was surprisingly found that the resulting construction provided sufficient strength, stretch and elasticity. It was thought that the step of stitching the double ply bodies together might reduce or eliminate the ability to stretch the resulting tie down body. However, the double ply body exhibits significant stretch and elasticity.

The flat, double-ply body of this embodiment of the tie down device includes a first end and a second end. As noted above, each end further comprises a first, flexible panel of hook and loop fastener material. The first panel may be secured to the body via stitching, adhesive, or the like. Preferably, given the thickness of the plies, the first fastener panel is adhered to the body, such as by a fabric glue, super glue, or high strength glue. It is also envisioned that the fastener material might be heat melted or otherwise permanently joined to the device body.

Perpendicularly extending away from the body proximate each end of the body is a second, flexible hook and loop fastener material panel. The second, flexible panel is secured to the opposite side of the device body via adhesive, stitching, or the like. Again, an adhesive, such as the adhesive sold under the E-6000™ brand, could be used.

In another embodiment, a selectively removable, rigid hook is provided. The first panel of the flexible hook and loop fastener is passed through an aperture in the body of the rigid hook. The first panel is folded, and it is secured to the second panel via the engagement of the hook and loop fasteners. The corresponding second panel is then secured around the body of the tie down device and the first panel. In this manner, the device terminates at a traditional, rigid hook when needed. Tension on the hook will act to pull the hook and loop fasteners tighter. Different sizes hooks can then be exchanged on the tie down device, which is contrary to the conventional wisdom of permanently securing one hook or lock to a tie down device.

In another embodiment, the end of the tie down device, including the fastener panels, is free of any rigid mechanical, metal, or plastic structure, tool, or the like. The absence of any hooks, locks, or the like allows the subject tie down device to be used without fear of damaging the anchor to which the tie down device is attached.

In another embodiment, the tie down device comprises a tubular body and a sole flexible panel of hook and loop fasteners is adhered or otherwise secured around the tubular body in the axial direction. The portion of the panel extending beyond the end of the tie down body is divided into two arms or forks. The arms can be wrapped around an anchor point or a single arm can be wrapped around an anchor point with the second arm wrapping around the first arm and the body of the tie down device. As above, one arm could be inserted through the body of a traditional rigid hook with the second arm providing the means to secure the first arm in a loop.

A stretchable, elastic tie down device with flexible, fabric fasteners in accordance with the present invention efficiently addresses various problems associated with prior art tie down devices. The apparatus and related method(s) comprise an unconventional approach to solving problems associated with known, conventional tie down devices. The foregoing, and additional objects, features, and advantages of the present invention will become apparent to those of skill in the art from the following detailed description of at least one preferred embodiment thereof, taken in conjunction with the accompanying drawings.

BRIEF DESCRIPTION OF THE SEVERAL VIEWS OF THE FIGURES

Figure 2:
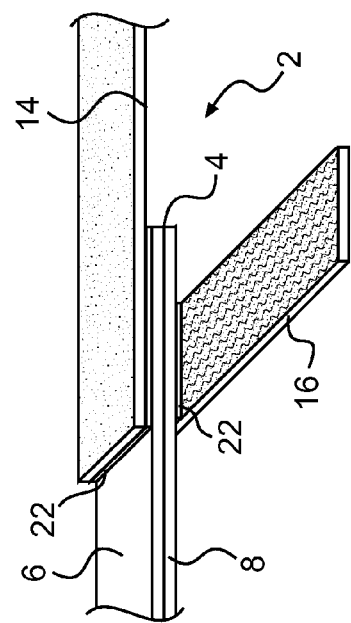
Figure 1:
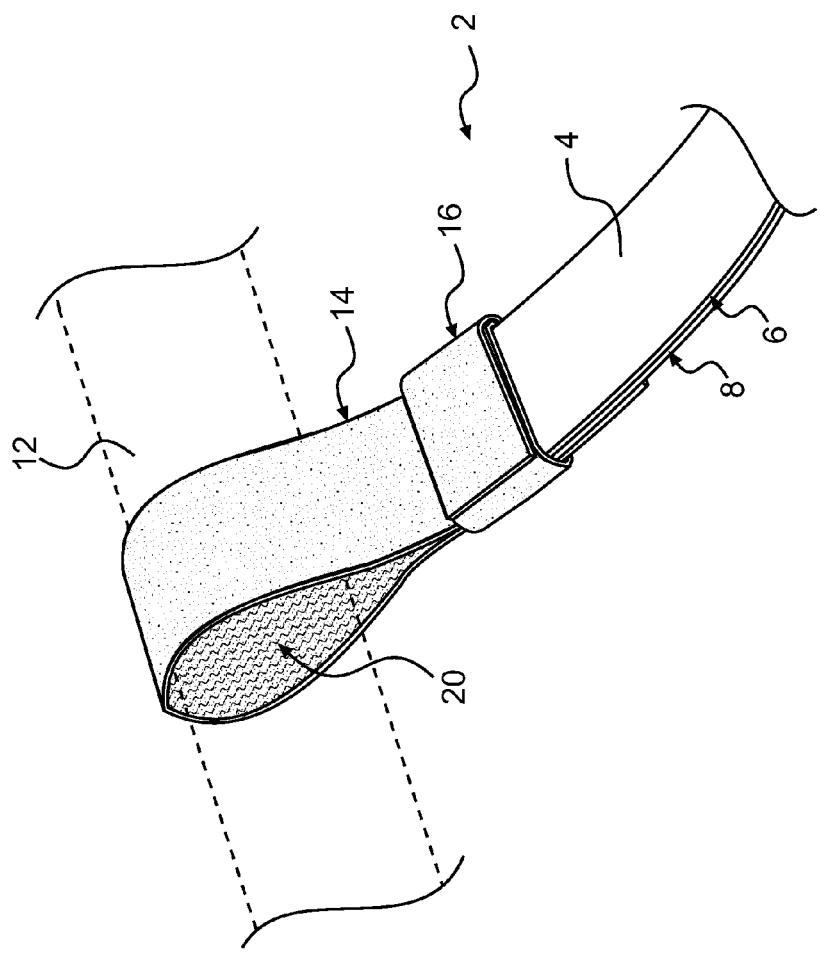
Figure 3:
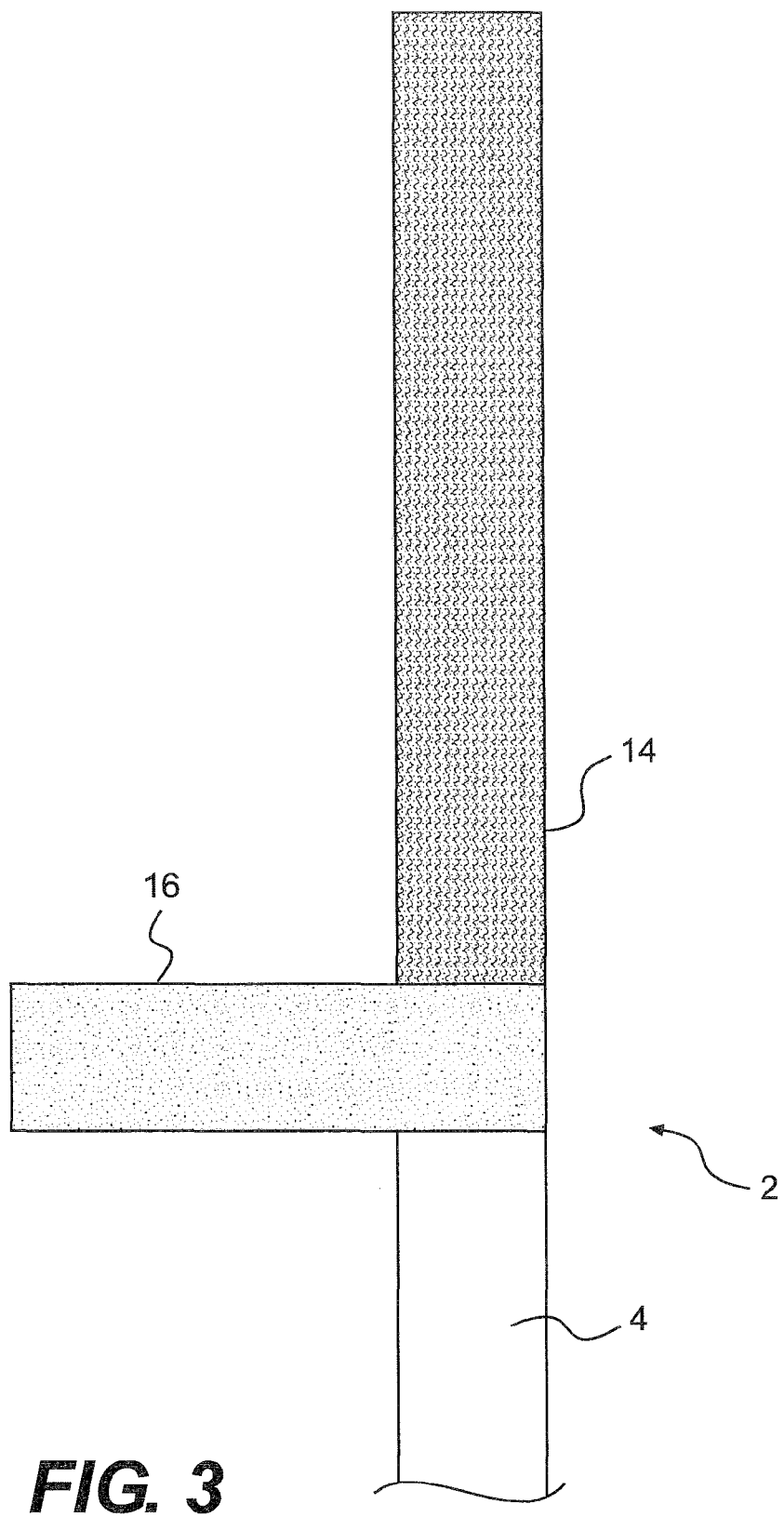
Figure 4:
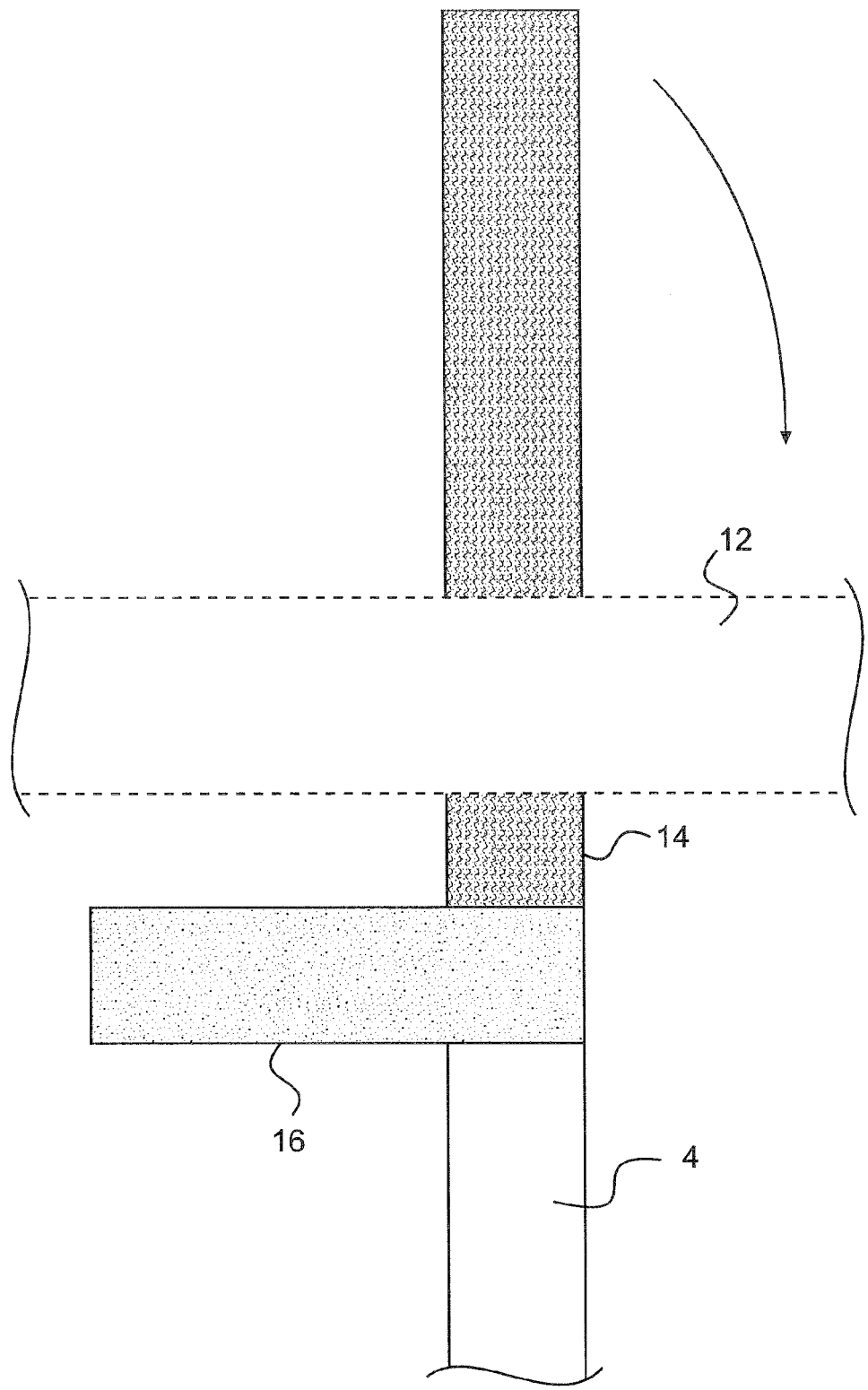
Figure 5:
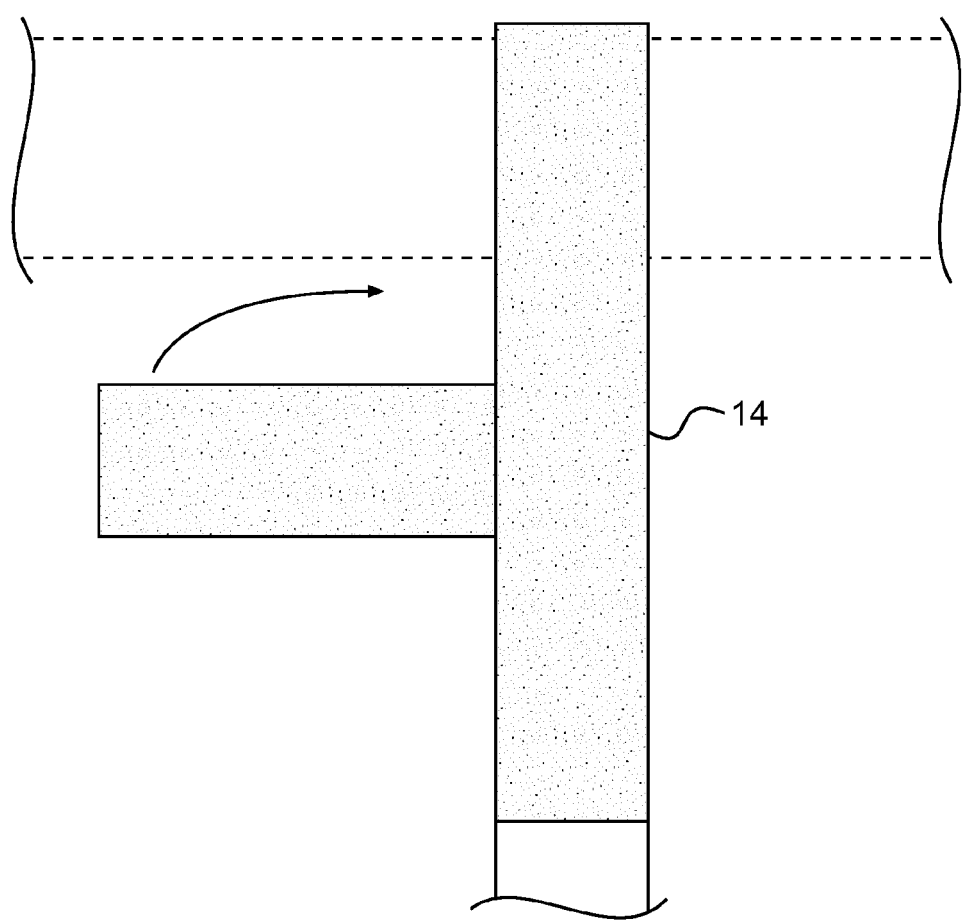
Figure 6:
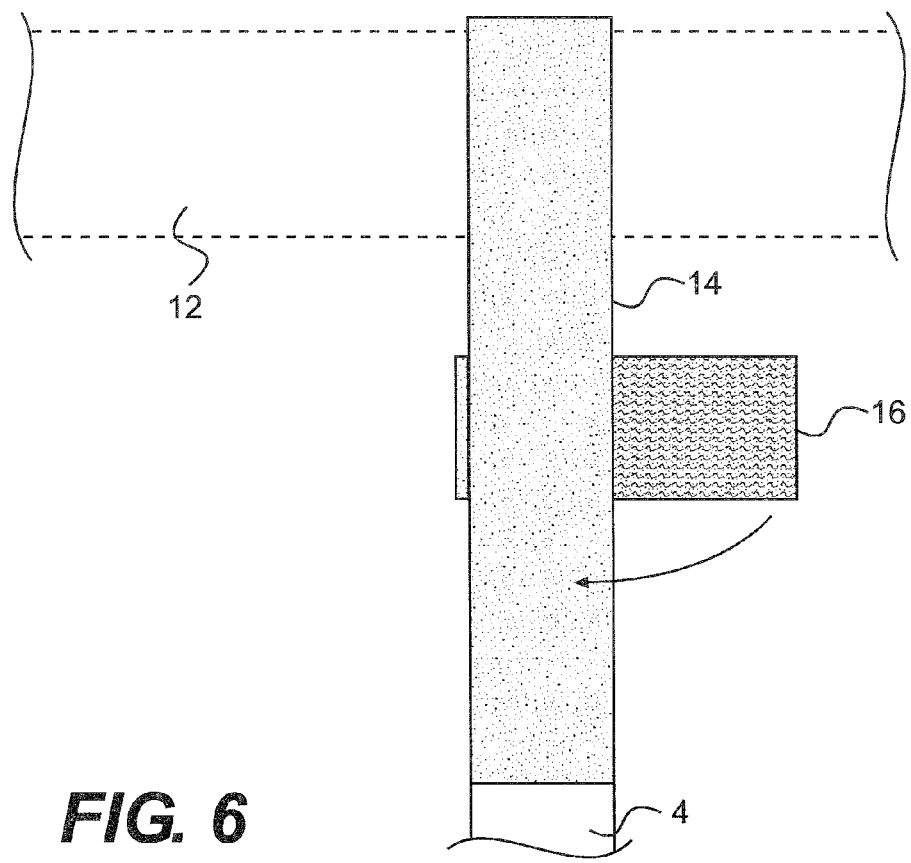
Figure 7:
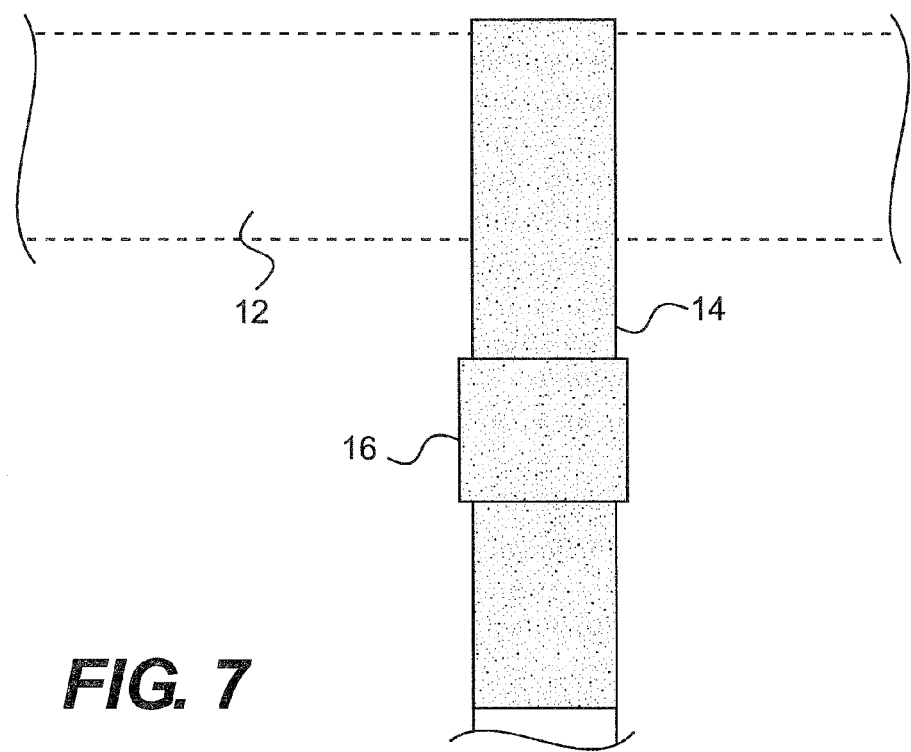

Having thus described the apparatus in general terms, one of skill in the art will appreciate additional advantages and features of the subject device upon reviewing the attached illustrations wherein:

FIG. 1 is a perspective view of one end of the subject tie down device with a double-ply flat body secured to an anchor point via the subject fastener panels as presently disclosed;

FIG. 2 is a side view thereof;

FIG. 3 is a close up view of one embodiment of the subject tie down device comprises a flat, stretchable body, a first hook and loop fastener panel extending from one side of the body beyond the end of the body, and a second hook and loop fastener panel extending perpendicularly from the body, as disclosed herein;

FIGS. 4-7 are additional views thereof; and

Figure 8:
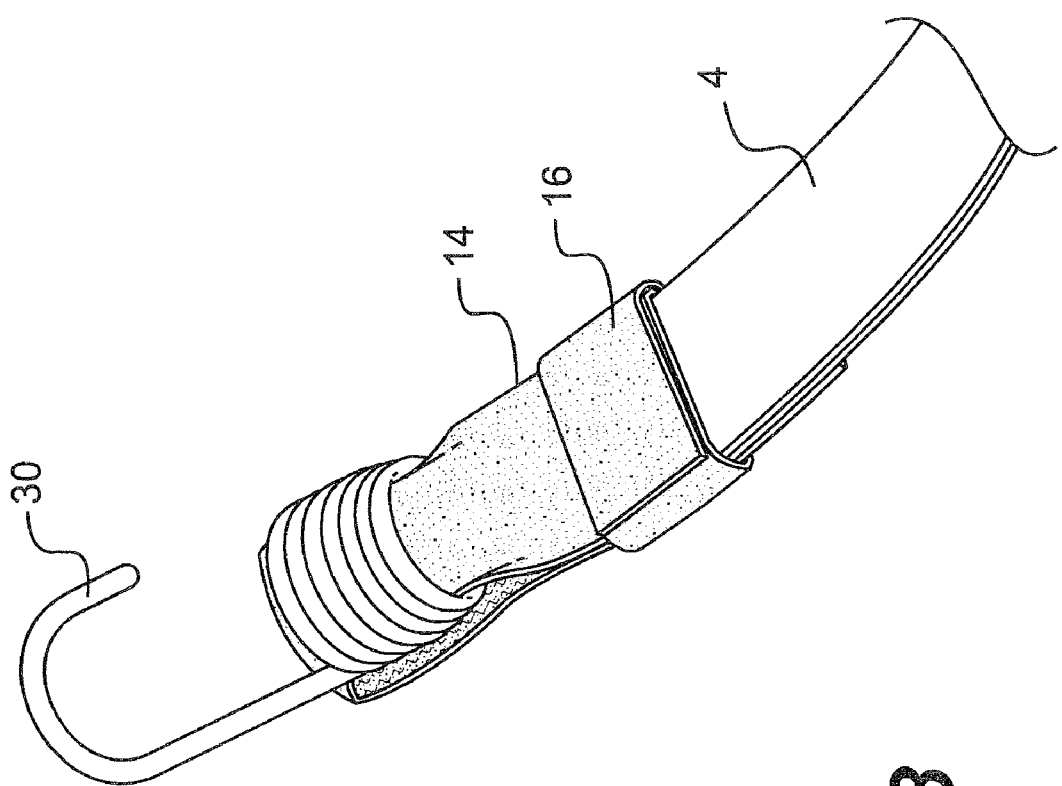

FIG. 8 is a view of one embodiment of the subject apparatus where a hook is selectively secured to the end of the subject tie down device.

DETAILED DESCRIPTION OF THE DISCLOSURE

The subject apparatus now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will convey the scope of the invention to those skilled in the art.

As briefly described above, conventional tie down devices that are stretchable and elastic include tubular bodies. Some tie down straps comprise a single-ply, non-stretchable body. In one embodiment of the subject apparatus, the tie down device body comprises a flat but stretchable and elastic material. In another embodiment, it has surprisingly been found that stitching two flat plies together does not sacrifice the elasticity of either ply. The plies may be combined to provide a stretchable, elastic body of ample strength.

With reference to FIGS. 1 and 3, there is illustrated a tie down device 2 comprising a flat body 4 of one embodiment of the subject apparatus. Flat body 4 can be a two-ply construction with a first ply 6 and a second ply 8 of substantially the same length. Each ply stretches in the axial direction to selectively lengthen body 4 under tension. Without tension, body 4 returns to its original length (i.e., body 4 is elastic).

Tie down device 2 terminates at a first end and second end. Either or both ends, as explained further below, can be selectively secured to an anchor point 12, typically under tension. One or both ends comprise a first, flexible hook and loop fastener panel 14 secured to the device body. First panel 14 comprises a plurality of fabric hooks on one side of the panel. The other side of the panel comprises fabric loops. Panel 14 is a fabric material as opposed to a rigid metal hook, as generally found on a conventional bungee cord. Eliminating the metal hook provides safety and other advantages over known tie down apparatuses. For instance, the first fabric panel 14 also doesn't scratch or otherwise mar the surface used to anchor the tie down device.

A portion of the fastener panel is sewn, adhered, heat-sealed, heat bonded, or otherwise secured to the device body. The adhesive can be fabric glue, such as fabric glue sold under E-6000™ brand.

First fastener panel 14 extends beyond the length of body 4. A second hook and loop fastener panel 16 extends perpendicularly from the body proximate each end of the body. In use, first fastener panel 14 is folded back and secured across second fastener panel 16. The hooks and/or loops of fastener panel 14 engage the hooks and/or loops of fastener panel 16.

With reference to FIG. 2, there is illustrated that first panel 14 and second panel 16 are attached to opposite sides of body 4. The first and second panels may be attached using, for example, adhesive 22. One side of each panel comprises hooks and the other side comprises loops. Either the hooks or the loops of each the first and second panels 14, 16 will face the corresponding hooks or loops of the other panel. In other words, first panel 14 should be secured to body 4 "upside down" from second panel 16. The second panel, which is perpendicularly aligned to the axis of body 4, can be secured flush with the end of the body or proximate to the end of the body.

The corresponding second fastener panel 16 is then folded around the corresponding first fastener panel 14 and body 4 of the tie down device 2. Depending on the length of second fastener panel 16, panel 16 might wrap around the tie down device 2 one or more times.

The operation of the tie down device is further illustrated in FIGS. 4-7, First fastener panel 14 creates a loop 20, and the resulting loop 20 can be used to anchor the device around anchor point 12. Second fastener panel 16 then provides additional force to secure the loop created by panel 14. By this construction, it is surprisingly found that the subject apparatus provides strength comparable to or greater than conventional rigid hook constructions. Conventional wisdom in the art is that hook and loop fasteners do not provide adequate strength relative to conventional rigid hook constructions or other constructions with rigid mechanical fasteners on the tie down device.

In another embodiment, and with reference to FIG. 8, a selectively removable, rigid hook 30 is provided. First panel 14 of the flexible hook and loop fastener is passed through an aperture in the body of rigid hook 30. First panel 14 is folded, and it is secured to the second panel 16 via the engagement of the hook and loop fasteners. The corresponding second panel 16 is then secured around body 4 of tie down device 2 and first panel 14. In this manner, the device terminates at a traditional, rigid hook when needed. Tension on hook 30 will act to pull the hook and loop fasteners tighter. Different size hooks can then be exchanged on the tie down device, which is contrary to the conventional wisdom of permanently securing one hook or lock to a tie down device.

In another embodiment, the end of the tie down device 2, including the fastener panels 14, 16, is free of any mechanical, metal, or plastic structure, tool, or the like. The absence of any hooks, locks, or the like allows the subject tie down device to be used without fear of damaging the anchor to which the tie down device is attached.

In another embodiment, the tie down device comprises a tubular body (as opposed to the illustrated flat body) and a sole flexible panel of hook and loop fasteners is adhered or otherwise secured around the tubular body in the axial direction. A portion of the panel extending beyond the end of the tie down body is divided into two arms or forks. The arms can be wrapped around an anchor point or a single arm can be wrapped around an anchor point with the second arm wrapping around the first arm and the body of the tie down device. As above, one arm could be inserted through the body of a traditional rigid hook with the second arm providing the means to secure the first arm in a loop.

While embodiments of the invention are described for use with specific members, it should be appreciated that other materials, shapes, and constructions can be used without deviating from scope of Applicant's disclosure.

What is claimed is:

1. An elastic tie down device comprising:
   a body, the body comprising two plies of an elongated, substantially flat, elastic material with a first end and a second end, the two plies being secured to each other;
   a first, flexible hook and loop fastener panel secured to the body along the axis of the elongated body at at least one end of the body, the first panel extending beyond the length of the body;
   a second, flexible hook and loop fastener panel secured to the body opposite the first panel and aligned substantially perpendicularly to the axis of the elongated body, the second panel secured to the body at a same end of the body as the first panel; and
   a selectively removable, rigid hook, the rigid hook comprising a rigid hook body and a hook extending from the rigid hook body, the rigid hook body further comprising an aperture through the body;
   wherein the first panel extends through the aperture in the rigid hook body and is folded and secured via a hook and loop mechanism to the corresponding second panel, and the second fastener panel is folded and secured, via a hook and loop mechanism, around the first panel.

2. A method for operating a tie down device comprising:
   providing an elastic tie down device including a body, the body comprising an elongated elastic material with a first end and a second end, a first, flexible hook and loop fastener panel secured to the body along the axis of the elongated body at least one end of the body, the first panel extending beyond the length of the body, and a second, flexible hook and loop fastener panel secured to the body opposite the first panel and aligned substantially perpendicularly to the axis of the elongated body, a second panel secured to the body at a same end of the body as the first panel;
   folding the first panel;
   securing the first panel to the second panel via a hook and loop mechanism;
   folding the second panel; and
   following the step of folding the second panel, securing the second panel to the first panel via a hook and loop mechanism.

3. The method of claim 2, further comprising the step of selectively securing a removable, rigid hook to the tie down device.

4. The method of claim 3, wherein the step of selectively securing a removable hook further comprises the step of passing the first panel through an aperture in a body of the rigid hook.

5. The method of claim 2, further comprising the step of ensuring the tie down device, including the first and second fastener panels, are free of any rigid mechanical, metal, or plastic structure or tool.

6. An elastic tie down device comprising:
   a body, the body comprising an elongated, substantially flat, elastic material with a first end and a second end;
   a first, flexible hook and loop fastener panel secured to the body along the axis of the elongated body at one end of the body, the first panel extending beyond the length of the body;
   a second, flexible hook and loop fastener panel secured to the body opposite the first panel and aligned substantially perpendicularly to the axis of the elongated body, the second panel secured to the body at a same end of the body as the first panel;
   a selectively removable, rigid hook, the rigid hook comprising a rigid hook body and a hook extending from the rigid hook body, the rigid hook body further comprising an aperture through the body; and
   the first panel extending through the aperture in the rigid hook body, the first panel secured via a hook and loop mechanism to the corresponding second panel, and the second fastener panel folded and secured, via a hook and loop mechanism, around the first panel.

* * * * *